US009890645B2

(12) United States Patent
McCaffrey et al.

(10) Patent No.: US 9,890,645 B2
(45) Date of Patent: Feb. 13, 2018

(54) COOLANT FLOW REDIRECTION COMPONENT

(71) Applicant: United Technologies Corporation, Hartford, CT (US)

(72) Inventors: Michael G. McCaffrey, Windsor, CT (US); Elizabeth F. Vinson, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 164 days.

(21) Appl. No.: 14/841,265

(22) Filed: Aug. 31, 2015

(65) Prior Publication Data

US 2016/0069193 A1    Mar. 10, 2016

Related U.S. Application Data

(60) Provisional application No. 62/045,749, filed on Sep. 4, 2014.

(51) Int. Cl.
*F01D 5/08* (2006.01)
*F01D 5/18* (2006.01)
(Continued)

(52) U.S. Cl.
CPC ............ *F01D 5/187* (2013.01); *F01D 5/082* (2013.01); *F02C 3/04* (2013.01); *F04D 29/053* (2013.01);
(Continued)

(58) Field of Classification Search
CPC .......... F01D 5/082; F01D 5/088; F01D 5/187; F01D 5/06; F01D 25/12; F01D 5/085;
(Continued)

(56) References Cited

U.S. PATENT DOCUMENTS 2,858,101 A * 10/1958 Alford .................... F01D 5/082
188/264 R
2,973,938 A    3/1961 Alford
(Continued)

FOREIGN PATENT DOCUMENTS

DE          3606597      2/1987
DE      102011051388    1/2012
(Continued)

OTHER PUBLICATIONS

Extended European Search Report for Application No. 15183647.5 dated Jun. 28, 2016.
(Continued)

*Primary Examiner* — William H Rodriguez
*Assistant Examiner* — James McGlynn
(74) *Attorney, Agent, or Firm* — Carlson, Gaskey & Olds, P.C.

(57) ABSTRACT

A gas turbine engine includes a compressor section, a combustor fluidly connected to the compressor section, and a turbine section fluidly connected to the combustor and mechanically connected to the compressor section via a shaft. Multiple rotors are disposed in one of the compressor section and the turbine section. Each of the rotors includes a rotor disk portion having a radially inward bore, and is static relative to the shaft. Each rotor is axially adjacent at least one other rotor and a gap is defined between each rotor and an adjacent rotor. A cooling passage for a cooling flow is defined between the shaft and the rotors, and a cooling flow redirection component is disposed at the gap and is operable to redirect the cooling flow in the cooling passage into the gap.

14 Claims, 7 Drawing Sheets

(51) Int. Cl.
*F02C 3/04* (2006.01)
*F04D 29/32* (2006.01)
*F04D 29/053* (2006.01)
*F04D 29/58* (2006.01)

(52) U.S. Cl.
CPC ......... *F04D 29/321* (2013.01); *F04D 29/584* (2013.01); *F05D 2220/32* (2013.01); *F05D 2240/60* (2013.01); *F05D 2260/201* (2013.01); *Y02T 50/676* (2013.01)

(58) Field of Classification Search
CPC ............... F01D 5/3007; F05D 2260/14; F05D 2260/201; F05D 2260/2122
USPC ................. 415/115, 416; 416/95, 96 R, 97 R
See application file for complete search history.

(56) References Cited

U.S. PATENT DOCUMENTS

| | | | | |
|---|---|---|---|---|
| 4,795,307 A * | 1/1989 | Liebl | ....................... | F01D 5/085 415/115 |
| 5,537,814 A | 7/1996 | Nastuk et al. | | |
| 7,775,764 B2 * | 8/2010 | Snowsill | ................. | F01D 5/082 415/115 |
| 8,186,939 B2 | 5/2012 | Lecuyer et al. | | |
| 9,394,798 B2 * | 7/2016 | Crites | .................... | F01D 5/186 |
| 2010/0290911 A1 | 11/2010 | Aschenbruck et al. | | |
| 2011/0052372 A1 | 3/2011 | Lecuyer et al. | | |
| 2011/0146298 A1 | 6/2011 | Reinhardt et al. | | |

FOREIGN PATENT DOCUMENTS

| | | |
|---|---|---|
| EP | 1091089 | 4/2001 |
| EP | 2186997 | 5/2010 |
| FR | 2450344 | 9/1980 |
| GB | 1284858 | 8/1972 |
| WO | 2014014535 | 1/2014 |
| WO | 2014186016 | 11/2014 |
| WO | 2015050680 | 4/2015 |

OTHER PUBLICATIONS

Extended European Search Report and Written Opinion for Application No. 15183647.5 dated Mar. 3, 2016.

\* cited by examiner

COOLANT FLOW REDIRECTION COMPONENT

CROSS-REFERENCE TO RELATED APPLICATION

This application claims priority to U.S. Provisional Application No. 62/045749 filed on Sep. 4, 2014.

STATEMENT REGARDING FEDERALLY SPONSORED RESEARCH OR DEVELOPMENT

This disclosure was made with Government support under FA8650-09-D-2923 awarded by The United States Air Force. The Government has certain rights in this invention.

TECHNICAL FIELD

The present disclosure relates generally to rotor disk configurations in a gas turbine engine, and more specifically to rotor disk cooling.

BACKGROUND

Gas turbine engines, such as those utilized in military and commercial aircraft utilize a compressor portion to compress air, a combustor portion to mix the compressed air with a fuel and ignite the mixture, and a turbine portion to expand the resultant gasses from the ignition. The expansion of the gasses in the turbine section drives the turbine section to rotate. The turbine section is tied to the compressor section by at least one shaft, and the rotation of the turbine section drives the rotation of the compressor section.

Included in the compressor section and the turbine section are multiple rotors. Each of the rotors includes a radially inward rotor disk and multiple rotor blades protruding radially outward from the rotor disk. The rotor blades are airfoil blades that protrude into the flow path defined by the compressor section and the turbine section. The rotor disks, and particularly the radially inward portions of the rotor disks, are thicker and take longer to heat up and cool down than the radially outward portion of the disks and the blades extending from the disks. As a result, thermal gradients can occur across the rotor disk. The thermal gradients reduce the effective lifespan of the disk.

SUMMARY OF THE INVENTION

In one example embodiment of the following disclosure, a gas turbine engine includes a compressor section, a combustor fluidly connected to the compressor section, a turbine section fluidly connected to the combustor and mechanically connected to the compressor section via a shaft, a plurality of rotors disposed in one of the compressor section and the turbine section, each of the rotors including a rotor disk portion including a radially inward bore, and each of the rotors being static relative to the shaft, each rotor in the plurality of rotors being axially adjacent at least one other of the rotors in the plurality of rotors and defining a gap between each of the rotors and the axially adjacent rotors, a cooling passage for a cooling flow defined between the shaft and the rotors, and a cooling flow redirection component disposed at the gap and operable to redirect the cooling flow in the cooling passage into the gap.

In a further example of the above embodiment, the gap is defined between radially aligned surfaces of adjacent rotor disks.

In a further example of any of the above embodiments, the cooling flow redirection component includes a radially outward protrusion from the shaft.

In a further example of any of the above embodiments, cooling flow through the cooling passage contacts a planar surface of the cooling flow redirection component.

In a further example of any of the above embodiments, cooling flow through the cooling passage contacts a curved surface of the cooling flow redirection component.

In a further example of any of the above embodiments, the cooling flow redirection component comprises a cooling flow redirection portion, the cooling flow redirection portion being angled relative to flow through the cooling passage such that coolant flow is redirected into the gap.

In a further example of any of the above embodiments, the cooling flow redirection component further comprises a radially aligned portion extending radially outward from the cooling flow redirection portion, relative to a radius of the engine, and wherein the radially aligned portion includes at least one through hole.

In a further example of any of the above embodiments, the through hole is a tapered through hole having an inlet with a first cross sectional area, and an outlet with a second cross sectional area, and wherein the second cross sectional area is smaller than the first cross sectional area.

In a further example of any of the above embodiments, the cooling flow redirection component is integral to one of the rotors defining the gap.

A further example of any of the above embodiments includes a secondary cooling flow inlet positioned at a radially outward edge of the gap.

In a further example of any of the above embodiments, the cooling flow redirection feature includes at least one cooling flow acceleration component positioned on an upstream surface of the cooling flow redirection feature, relative to cooling flow through the cooling flow passage.

In another example embodiment of the following disclosure, a method for cooling rotor bores includes providing a cooling flow path radially inward of a set of rotor bores and radially outward of a shaft in one of a turbine section and a rotor section of a turbomachine, redirecting at least a portion of cooling flow in the cooling flow path into a gap defined between adjacent rotor bores, thereby increasing cooling of the rotor bores, and returning at least a portion of the redirected cooling flow to the cooling flow path.

In a further example of any of the above embodiments, redirecting at least a portion of cooling flow in the cooling flow path into a gap defined between adjacent rotor bores, thereby increasing cooling of the rotor bores comprises disposing a cooling flow redirection component in the cooling flow path at the gap.

In a further example of any of the above embodiments, disposing a cooling flow redirection component in the cooling flow path at the gap comprises disposing a first surface of the cooling flow redirection component in the flow path, such that a cooling flow contacting the first surface is redirected into the gap.

In a further example of any of the above embodiments, the first surface is approximately normal to the cooling flow.

In a further example of any of the above embodiments, the first surface is a curved surface.

A further example embodiment of any of the above embodiments includes supporting the cooling flow redirection component on the shaft at the gap.

A further example embodiment of any of the above embodiments includes supporting the cooling flow redirection component on at least one of set of rotor bores.

In one example embodiment of the following disclosure, a cooling flow redirection component includes a first cooling flow redirection surface operable to interfere with a cooling flow and redirect the cooling flow radially outward, and an interconnection feature operable to interconnect the cooling flow redirection component with at least one of a first rotor bore defining a gap, a second rotor bore defining a gap and a shaft defining a cooling flow passage radially inward of the rotor bores.

A further example embodiment of any of the above embodiments includes a hole in the cooling flow redirection component, wherein the hole directs cooling flow passing through the hole such that the cooling flow passing through the hole forms an impingement cooling jet.

These and other features of the present invention can be best understood from the following specification and drawings, the following of which is a brief description.

DETAILED DESCRIPTION OF AN EMBODIMENT

Figure 1:
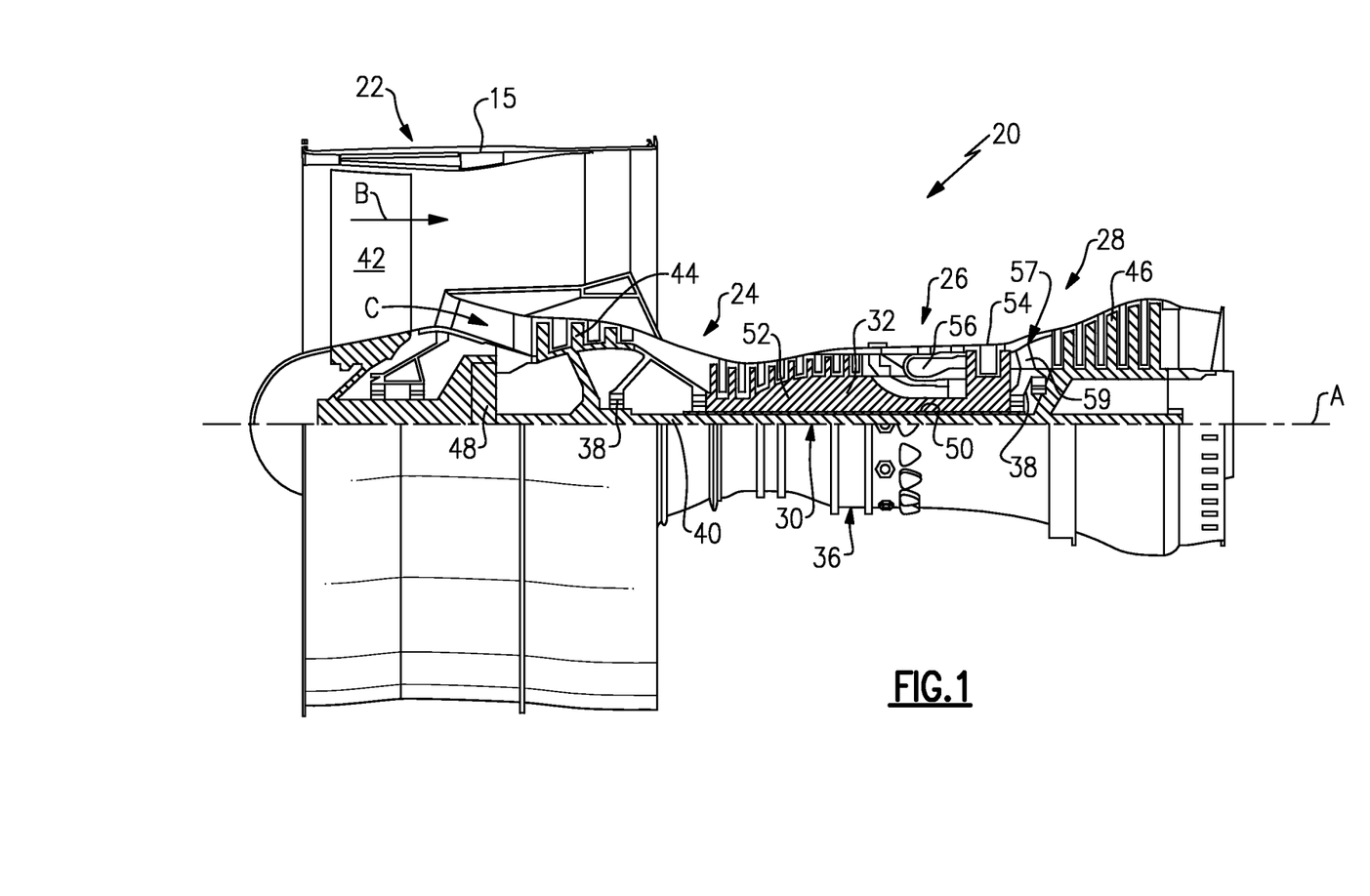
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Within each of the compressor section 24 and the turbine section 28 are multiple rotors. Each of the rotors includes a rotor disk positioned about the axis and connected to one of the shafts 40, 50. The connection between each rotor disk and the corresponding shaft can be either a direct connection or an indirect connection. Protruding radially outward from each rotor disk are multiple rotor blades. The rotor blades extend radially outward into the core flow path C. interspersed between each rotor and the adjacent rotor or rotors in the compressor section 24 or turbine section 28 are multiple stators. The combination of the rotors and the stators defines the flow path in the compressor section 24 or the turbine section 28.

Figure 2:
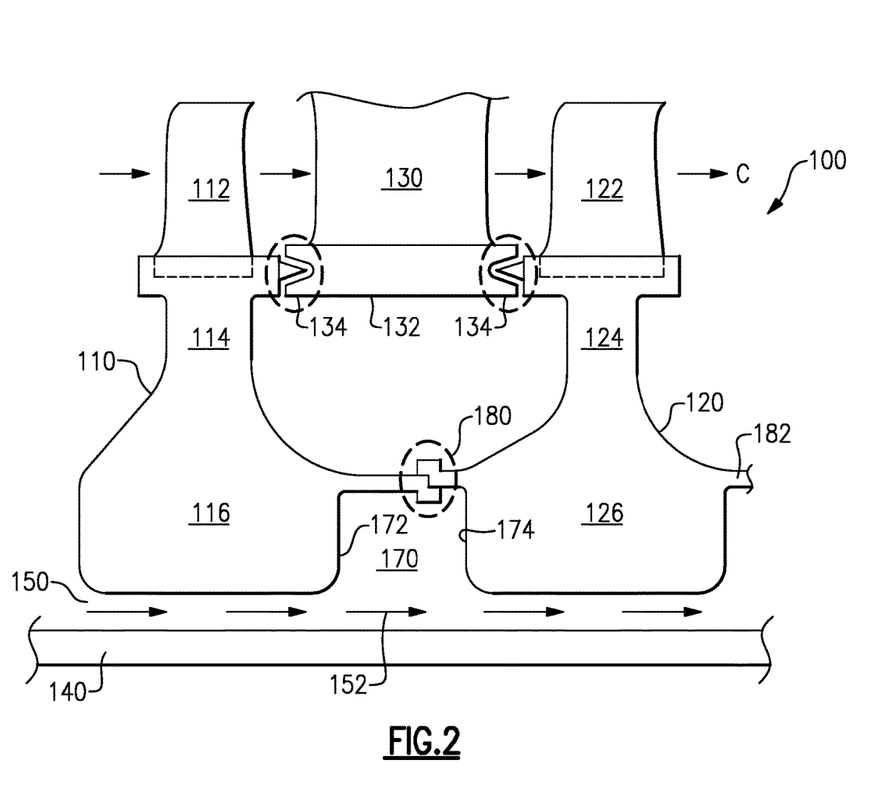
FIG. 2 schematically illustrates a partial view of a turbine section for the gas turbine engine of FIG. 1.

With continued reference to FIG. 1, FIG. 2 schematically illustrates a partial view of a rotor/stator arrangement 100 such as could be utilized in either a compressor section 24 or a turbine section 28 of the gas turbine engine 20 of FIG. 1. A first rotor disk 110 includes a rotor bore 116 and a radially outward portion 114. Protruding from the radially outward portion 114 is a rotor blade 112. Immediately downstream of the first rotor 110, in the core flow path C, is a stator 130. An inner diameter 132 of the stator 130 is interfaced with the radially outward portion 114 of the rotor disk 110 via a seal 134. The seal 134 allows the rotor disk 110 to rotate relative to the stator 130 and maintains the integrity of the core flow path C. Immediately downstream of the stator 130 is a second rotor disk 120 including a rotor bore 126 and a radially outward region 124. As with the first rotor disk 110, the second rotor disk 120 includes multiple rotor blades 122 extending radially outward from the rotor disk 120 into the core flow path C. The first rotor disk 110 and the second rotor disk 120 are considered to be adjacent to each other, as there are no intervening rotor disks 110, 120.

Defined between the rotor disks 110, 120 and a shaft 140 is a cooling passage 150. Cooling air is passed through the cooling passage 150 along a cooling flow path 152. The cooling air cools the rotor bores 116, 126 as the air passes through the cooling passage 150.

The rotor disks 110, 120 are mechanically connected via a joint 180. The joint 180 ensures that the rotor disks 110, 120 rotate together. The second rotor disk 120 further includes an extension 182 that is connected to a further rotor connected to the shaft 140, or is connected directly to the shaft 140. Due to the connection between the rotor disk 120 and the shaft 140, the rotor disks 110, 120 and the shaft 140 spin together, and the rotor disks 110, 120 are static relative to the shaft 140.

Defined between the first and second rotor disks 110, 120 and radially inward of the joint 180 is a gap 170. Further defining the gap 170 is a radially aligned surface 172 of the first rotor disk 110 and a radially aligned surface 174 of the second rotor disk 120.

During operation of the gas turbine engine 20, the rotor blades 112, 122 and the rotor disks 110, 120 are exposed to extreme temperatures, and extreme temperature changes. As the radially outward portions 114, 124 of the rotor disks 110, 120 and the rotor blades 112, 122 are significantly thinner than the rotor bores 116, 126 of the rotor disks 110, 120, the radially outward regions 114, 124 and the rotor blades 112, 122 heat up and cool down significantly faster than the rotor bores 116, 126. The different heating and cooling rates can result in large radial thermal gradients on the rotor disks 110, 120. The large thermal gradients impart significant thermal stress on the rotor disks 110, 120 and reduce the lifespan of the rotor disks 110, 120.

In order to reduce the thermal gradients, a cooling flow 152 is provided in the cooling passage 150. The cooling flow 152 contacts a radially inward surface of each of the rotor disks 110, 120 and provides additional cooling to the rotor bore regions 116, 126. A minimal amount of the cooling flow 152, if any, leaks into the gap 170, and minimal cooling is achieved in the gap 170. In some examples, a heating flow can be provided along the same path 152, when heating of the rotor bores 116, 126 is desired.

Figure 3:
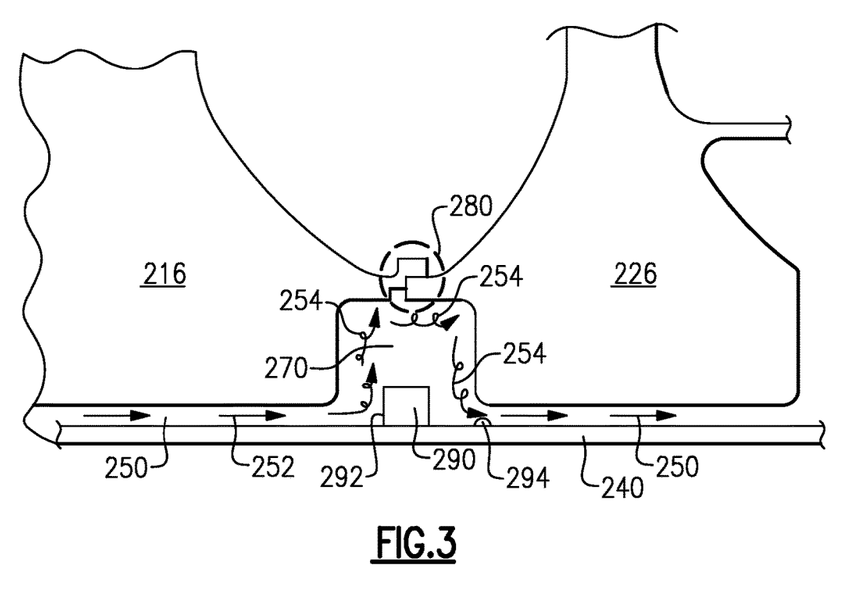
FIG. 3 schematically illustrates a first example cooling feature disposed in a gap defined by two adjacent rotor disks.

With continued reference to FIG. 2, and with like numerals indicating like elements, FIG. 3 schematically illustrates adjacent rotor bores 216, 226 defining a gap 270. As with the example of Figure 2, the rotor bores 216, 226 and a shaft 240 define a cooling passage 250 through which a cooling flow 252 flows. The two rotor bores 216, 226 are joined at a joint 280, and are static relative to the shaft 240.

Disposed within the gap 270 is a cooling flow redirection component 290. In the example of FIG. 3, the cooling flow redirection component 290 is a radial protrusion from the shaft 240. The cooling flow redirection component 290 protrudes into the gap 270 and includes an upstream facing surface 292. The upstream facing surface 292 intersects with the cooling flow 252 and redirects the cooling flow 252 radially outward from the cooling flow 252 into the gap 270. The illustrated example surface 292 is approximately normal to the cooling flow 252 and causes the redirected cooling flow 254 to be turbulent as the redirected cooling flow 254 passes through the gap 270. The introduced turbulence further increases the contact between the redirected cooling flow 254 and the radially aligned surfaces defining the gap 270. The increased contact, in turn increases the magnitude of the cooling provided to the corresponding rotor bore region 216, 226.

After passing through the gap 270, the redirected cooling flow 254 returns to the cooling passage 250. In some examples, a flow correcting feature 294, such as a flow guide, is included in the gap 270 to remove turbulence from the redirected cooling flow 254 as the flow returns to the cooling passage 250.

The increased cooling provided by the cooling flow redirection component 290 and the redirected cooling flow 254 increases the cooling rate of the rotor bores 216, 226, thereby decreasing the thermal gradients on the rotor disks 110, 120 (illustrated in FIG. 2).

In some examples, the cooling flow redirection component 290 is integral to the shaft 240. In alternate examples, the cooling flow redirection component 290 is an additional component installed on the shaft 290 as part of engine assembly.

Figure 4:
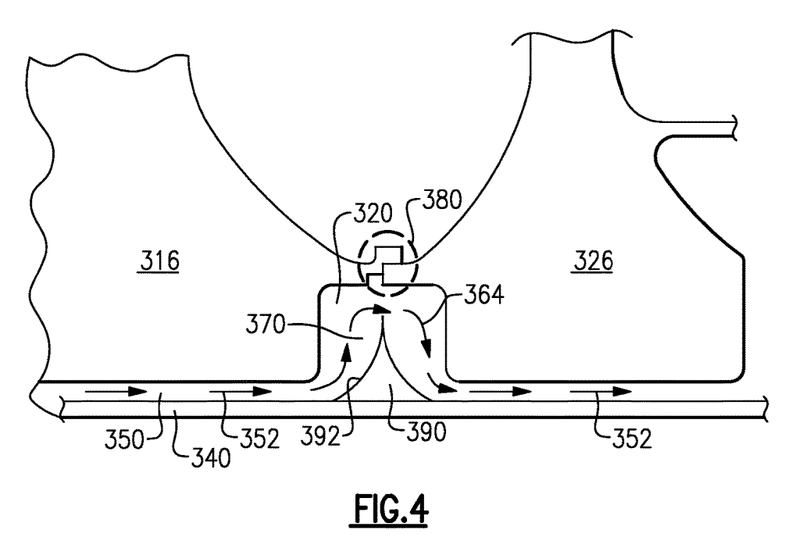
FIG. 4 schematically illustrates a second example cooling feature disposed in a gap defined by two adjacent rotor disks.

With continued reference to FIGS. 2 and 3, and with like numerals indicating like elements, FIG. 4 schematically illustrates second example configuration of adjacent rotor bores 316, 326 defining a gap 370. As with the example of FIG. 2, the rotor bores 316, 326 and a shaft 340 define a cooling passage 350 through which a cooling flow 352 flows. The two rotor bores 316, 326 are joined at a joint 380, and are static relative to the shaft 340.

As with the example of FIG. 3, disposed within the gap 370 is a cooling flow redirection component 390. In the example of FIG. 4, the cooling flow redirection component 390 is radial protrusion from the shaft 340. The cooling flow redirection component 390 protrudes into the gap 370 and includes an upstream facing surface 392. The upstream facing surface 392 is a curved surface that is concave relative to the flow direction of the cooling flow 352. The concave curved surface redirects the cooling flow 252 along a redirected cooling flow path 364 without introducing turbulence. The redirected cooling flow path 364 travels along the radially aligned surfaces of the rotor bores 316, 326 defining the gap 370. As the redirected cooling flow travels along the redirected cooling flow path 354, the rotor bores 316, 326 receive increased cooling. At the downstream edge of the gap 270, the redirected cooling flow 364 is returned to the cooling flow path 350.

Further, as with the example of FIG. 3, the cooling flow redirection component 390 can be constructed integral to the shaft 240 in some examples, and can be a separate component installed onto the shaft as part of the engine assembly in other examples.

With reference to both the cooling flow redirection component 290 of FIG. 3, and the cooling flow redirection component 390 of FIG. 4, the cooling flow redirection components 290, 390 are elements that redirect the cooling flow into the gap 270, 370 without restricting the cooling flow. Depending on the dimensions of the gap 270, 370, and the dimensions of the cooling flow redirection component 290, 390, cooling flow through the gap 270 can be slowed down, increasing exposure time between the cooing flow and the radially aligned surfaces of the bore regions 216, 316, 226, 326 or maintained the same.

Figure 5:
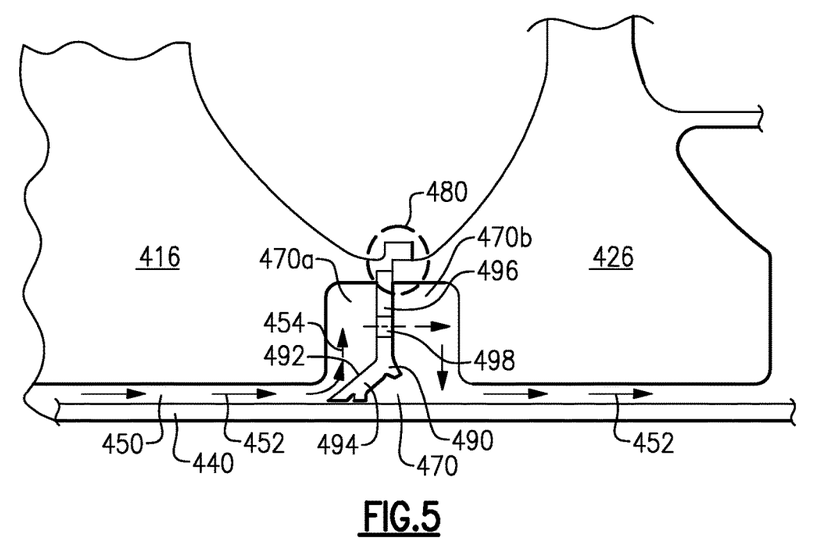
FIG. 5 schematically illustrates a third example cooling feature disposed in a gap defined by two adjacent rotor disks.

With continued reference to FIGS. 2-4, and with like numerals indicating like elements, FIG. 5 schematically illustrates a third example configuration of adjacent rotor bores 416, 426 defining a gap 470. As with the example of FIG. 2, the rotor bores 416, 426 and a shaft 440 define a cooling passage 450 through which a cooling flow 452 flows. The two rotor bores 416, 426 are joined at a joint 480, and are static relative to the shaft 440.

Interconnecting in the joint 480, is a cooling flow redirection component 490. The cooling flow redirection component 490 has an angled surface 492 on a cooling flow redirection portion 494. The angled surface 492 is angled relative to the cooling flow 452 through the cooling passage 452. Protruding radially outward from the cooling flow redirection portion 494 is a radially aligned portion 496. The radially aligned portion 496 is interconnected in the joint

480. Further included in the radially aligned portion 496 are one or more holes 498. The cooling flow redirection component 490 splits the gap 470 into an upstream portion 470a and a downstream portion 470b, with the hole 498, or holes, connecting the two portions 470a, 470b. In the illustrated example of FIG. 5, the walls of the hole 498 are aligned with the axis of the engine 20, and do not further restrict flow between the portions 470a, 470b.

During operation, the cooling flow 452 contacts the angled surface 492 and is redirected radially outward as a redirected cooling flow 454. The redirected cooling flow 454 passes along the radially aligned surface of the upstream rotor bore 416, cooling the upstream rotor bore 416. The redirected cooling flow 454 then passes through the hole 498 and is directed toward the radially aligned surface of the downstream rotor bore 426. The redirected cooling flow 454 impinges on the radially aligned surface of the downstream rotor bore 426 providing a further impingement cooling effect. The redirected cooling flow 454 is then returned to the cooling flow path 452.

In the illustrated example of FIG. 5, the cooling flow redirection component 490 is a distinct component that is interconnected with the joint 480 using any known interconnection technique during assembly of the engine 20. In alternate examples, the cooling flow redirection component 490 can be integrally formed with either the upstream rotor disk 110 (illustrated in FIG. 2) or the downstream rotor disk 120 (illustrated in FIG. 2).

Figure 6:
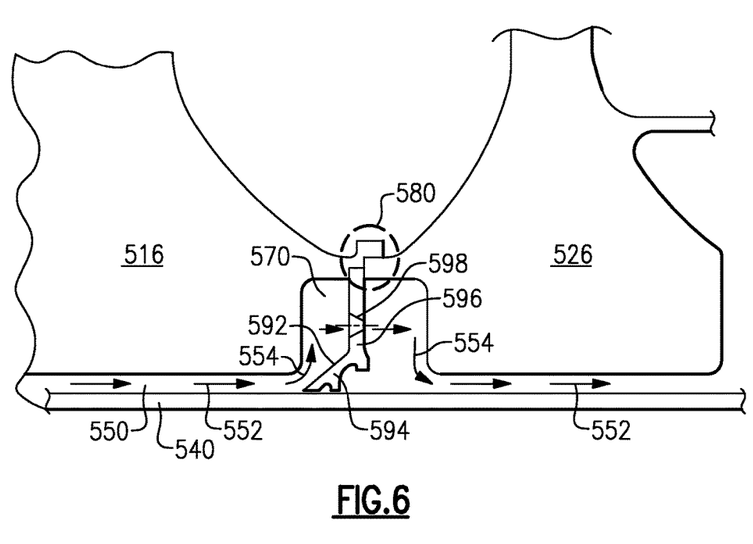
FIG. 6 schematically illustrates a fourth example cooling feature disposed in a gap defined by two adjacent rotor disks.

Turning our attention now to FIG. 6, and with continued reference to FIG. 5, FIG. 6 illustrates a fourth example configuration of adjacent rotor bores 516, 526 defining a gap 570. As with the example of FIG. 5, the rotor bores 516, 526 and a shaft 540 define a cooling passage 550 through which a cooling flow 552 flows. The two rotor bores 516, 526 are joined at a joint 480, and are static relative to the shaft 440.

The cooling flow redirection component 590 of FIG. 6, and the gap 570 arrangement of FIG. 5 are similar to those of FIG. 5 with the exception of the hole 598. In the example of FIG. 6, the hole 598 is tapered such that the downstream opening of the hole 598 has a smaller cross sectional area than the upstream opening of the hole 598. As a result of the tapering, the cooling flow passing through the hole 498 is accelerated, increasing the impingement on the radially aligned surface of the downstream rotor bore 526. Further, the specific angle of the tapering in the hole 598 can be adjusted and determined by one of skill in the art, having the benefit of this disclosure, to direct the cooling flow to a specific area of the radially aligned downstream bore and provide increased cooling to the specific area.

Figure 7:
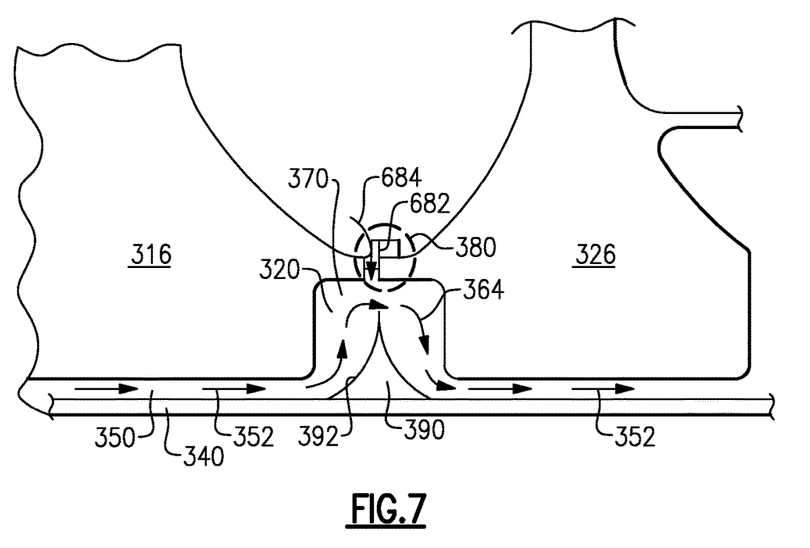
FIG. 7 schematically illustrates a fifth example cooling feature disposed in a gap defined by two adjacent rotor disks.

With continued reference to each of the preceding examples, and with like numerals indicating like elements, FIG. 7 illustrates the example of FIG. 4 with an additional cooling feature disposed in the joint 380. One of skill in the art, having the benefit of this disclosure will appreciate that the additional cooling feature in the joint 380 can be applied to each of the preceding examples, and is not limited to the example illustrated in FIG. 7.

The joint 380 in the example of FIG. 7 includes a passage 682, alternatively referred to as a cooling flow inlet, such as a through hole. The passage 682 provides a secondary cooling flow path 684 through the joint 380 at a radially outward edge of the gap 370. The secondary flow path 684 provides a supplemental cooling flow to increase the cooling flow through the redirected cooling flow 364 and the cooling flow path 352 downstream of the gap 370.

While each of the above examples is illustrated as a single cooling flow redirection component disposed in a gap between adjacent rotor disks, one of skill in the art, having the benefit of this disclosure will understand that in a practical gas turbine engine, multiple rotor disks will be adjacent in a stack, resulting in the creation of multiple gaps. Cooling flow redirection components, as described above, can be included in one or more of the gaps in a practical engine depending on the specific cooling needs of the engine, and engines including multiple cooling flow redirection components are within the contemplation of this disclosure.

Further, while illustrated herein the context of a geared turbofan engine, one of skill in the art, having the benefit of this disclosure will understand that the above cooling arrangements can be incorporated into any rotary machine, including direct drive turbines, land based turbines, marine turbines, or the like, and is not limited to geared turbine engines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section;
   a combustor fluidly connected to the compressor section;
   a turbine section fluidly connected to the combustor and mechanically connected to said compressor section via a shaft;
   a plurality of rotors disposed in one of said compressor section and said turbine section, each of said rotors including a rotor disk portion including a radially inward bore, and each of said rotors being static relative to said shaft;
   each rotor in said plurality of rotors being axially adjacent at least one other of said rotors in said plurality of rotors and defining a gap between each of said rotors and said axially adjacent rotors, wherein each of said rotors includes a joint arm partially crossing said gap;
   a cooling passage for a cooling flow defined between said shaft and said rotors; and
   a cooling flow redirection component disposed at said gap and operable to redirect said cooling flow in said cooling passage into said gap, wherein the cooling flow redirection component is distinct from said rotors in said plurality of rotors, wherein the cooling flow redirection component comprises a cooling flow redirection portion, said cooling flow redirection portion being angled relative to flow through said cooling passage such that coolant flow is redirected into said gap, and a radially aligned portion including a tapered through hole having an inlet with a first cross sectional area, and an outlet with a second cross sectional area, the radially aligned portion being radially outward from said cooling flow redirection portion, relative to a radius of the engine.

2. The gas turbine engine of claim 1, wherein said gap is defined between radially aligned surfaces of adjacent rotor disks.

3. The gas turbine engine of claim 1, wherein said cooling flow redirection component includes a radially outward protrusion from said shaft.

4. The gas turbine engine of claim 3, wherein cooling flow through said cooling passage contacts a planar surface of said cooling flow redirection component.

5. The gas turbine engine of claim 1, wherein the second cross sectional area is smaller than the first cross sectional area.

6. The gas turbine engine of claim 1, wherein said cooling flow redirection component is integral to one of said rotors defining said gap.

7. The gas turbine engine of claim 1, further comprising a secondary cooling flow inlet positioned at a radially outward edge of said gap.

8. The gas turbine engine of claim 1, wherein said cooling flow redirection component includes at least one cooling flow acceleration component positioned on an upstream surface of said cooling flow redirection component, relative to cooling flow through said cooling flow passage.

9. The gas turbine engine of claim 1, wherein each of said joint arms contacts a joint arm of an adjacent rotor at a joint contact.

10. The gas turbine engine of claim 9, wherein the cooling flow redirection component includes a portion disposed at the joint contact.

11. The gas turbine engine of claim 10, wherein the joint contact is configured to retain the portion of the cooling flow redirection component disposed at the joint contact.

12. The gas turbine engine of claim 1, wherein each of said joint arms is integral to the corresponding rotor.

13. The gas turbine engine of claim 1, wherein the tapered through hole defines a through hole axis, and wherein the through hole axis is aligned with an axis defined by the shaft.

14. The gas turbine engine of claim 1, wherein the flow redirection portion is a planar surface, and wherein the cooling flow redirection portion is angled relative to an axis defined by the shaft.

* * * * *